United States Patent
Gupta et al.

(10) Patent No.: US 11,836,161 B2
(45) Date of Patent: Dec. 5, 2023

(54) SYSTEMS AND METHODS FOR PREDICTING WHERE CONVERSATIONS ARE HEADING AND IDENTIFYING ASSOCIATED CONTENT

(71) Applicant: Rovi Guides, Inc., San Jose, CA (US)

(72) Inventors: Vikram Makam Gupta, Karnataka (IN); Vishwas Sharadanagar Panchaksharaiah, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 173 days.

(21) Appl. No.: 16/796,106

(22) Filed: Feb. 20, 2020

(65) Prior Publication Data

US 2021/0263952 A1    Aug. 26, 2021

(51) Int. Cl.
*G06F 16/00* (2019.01)
*G06F 16/28* (2019.01)
*G06F 16/23* (2019.01)
*G10L 15/22* (2006.01)

(52) U.S. Cl.
CPC ........ *G06F 16/285* (2019.01); *G06F 16/2379* (2019.01); *G10L 15/22* (2013.01)

(58) Field of Classification Search
None
See application file for complete search history.

(56) References Cited

U.S. PATENT DOCUMENTS

| | | | | |
|---|---|---|---|---|
| 2014/0149177 | A1* | 5/2014 | Frank | G06Q 10/06 705/7.29 |
| 2016/0210563 | A1* | 7/2016 | Bhagwat | G10L 15/26 |
| 2020/0043479 | A1* | 2/2020 | Mont-Reynaud | G10L 15/30 |
| 2020/0342853 | A1* | 10/2020 | Ji | G10L 15/02 |

* cited by examiner

*Primary Examiner* — Anhtai V Tran
(74) *Attorney, Agent, or Firm* — Haley Guiliano LLP (57) ABSTRACT

Systems and methods are described for predicting a future topic of a current conversation and providing content associated with the predicted topic. A topic may be predicted based on a first part of a current conversation between a first user and a second user and information about the first user and the second user. Content associated with the predicted topic may be identified, and information about the identified content may be provided to a device associated with the first user or the second user.

20 Claims, 8 Drawing Sheets

SYSTEMS AND METHODS FOR PREDICTING WHERE CONVERSATIONS ARE HEADING AND IDENTIFYING ASSOCIATED CONTENT

BACKGROUND

The present disclosure is directed to systems for providing information about content, and, more particularly, for providing information about content associated with a predicted topic of a current conversation.

SUMMARY

As smartphone use has proliferated, users increasingly rely on their smartphones to search for content that they are interested in. When a user is engaged in a conversation with another user or group of users, the user may be interested in content that is related to discussion topics of the conversation (e.g., to improve their contribution to the conversation or to better understand the conversation). However, because searching for content would require a user to stop the conversation and input a search into their smartphone, the inconvenience would likely preclude a user from searching for said content. Additionally, by the time a user inputs the search and identifies related content, the conversation may have already moved onto another topic. Accordingly, it would be advantageous to users if future topics that may be discussed during the conversation were predicted, and content related to the predicted topics were provided to the users in real-time during the conversation.

Systems and methods are provided herein for predicting a future topic of a conversation between users based on a first part of the current conversation and information about the users, and providing content identified as being related to the predicted future topic. The first part of the conversation between the first user and the second user is received. A topic of a second part of the conversation between the first user and the second user is predicted based on the received first part of the conversation and information about the first user and the second user. Content associated with the predicted topic is identified, and information about the identified content is provided.

In some embodiments, the first part of the conversation corresponds to a conversation captured by a listening device. In other embodiments, the first part of the conversation corresponds to a conversation on a text messaging platform.

In some embodiments, a database of classified information about a plurality of prior conversations between users and information of the users may be accessed. The information in the database may be classified using a first data classification algorithm. The topic of the second part of the conversation may be predicted using a second data classification algorithm to predict the topic of the second part of the conversation based on the received first part of the conversation, the information about the first user and the second user, and the accessed database of classified information. The database of classified information may be updated with information about the conversation between the first user and the second user and the information about the first user and the second user. The information about the conversation between the first user and the second user and the information about the first user and the second user may be classified using the first data classification algorithm.

In some embodiments, a number of topics of the received first part of the conversation may be determined. If it is determined that there is one and only one topic of the received first part of the conversation, the topic of the second part of the conversation may be predicted by predicting a sub-topic of the topic of the received first part of the conversation. If it is determined that there is more than one topic of the received first part of the conversation, the topic of the second part of the conversation may be predicted by predicting a new topic related to the topics of the received first part of the conversation.

In some embodiments, the information about the first user and the second user may be retrieved from a database. The information about the first user and the second user may include at least one of a relationship between the first user and the second user, a content viewing history of at least one of the first user and the second user, an age of at least one of the first user and the second user, and a gender of at least one of the first user and the second user. The information about the first user and the second user may also include a stickiness score of at least one of the first user and the second user. The stickiness score may correspond to a length of a time period before a prior conversation associated with a first topic becomes associated with a second topic, the prior conversation being a prior conversation of at least one of the first user and the second user.

In some embodiments, the information about the identified content may be provided to a device associated with at least one of the first user and the second user.

In some embodiments, the information about the identified content may be provided to a device associated with a user other than the first user or the second user.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Advancements of digital transmission and processing of audio content have increased the speed and efficiency that digital speech assistants (e.g., voice-activated devices) can detect, process, and respond to a voice input from a user. For example, advancements in audio processing capabilities have enabled low-power digital speech assistants to perform "always-on" listening capabilities to trigger functions associated with the digital speech assistants. Oftentimes, for a digital speech assistant to perform a function associated with a voice input from a user, the user must speak a keyword or a keyword phrase. Although the digital speech assistant will not perform a function until the user speaks the keyword or keyword phrase, the digital speech assistant may capture conversations during "always-on" listening. These captured conversations may be stored in the cloud. With the proliferation of digital speech assistants, the number of captured conversations that are stored in the cloud may be very large.

Figure 1:
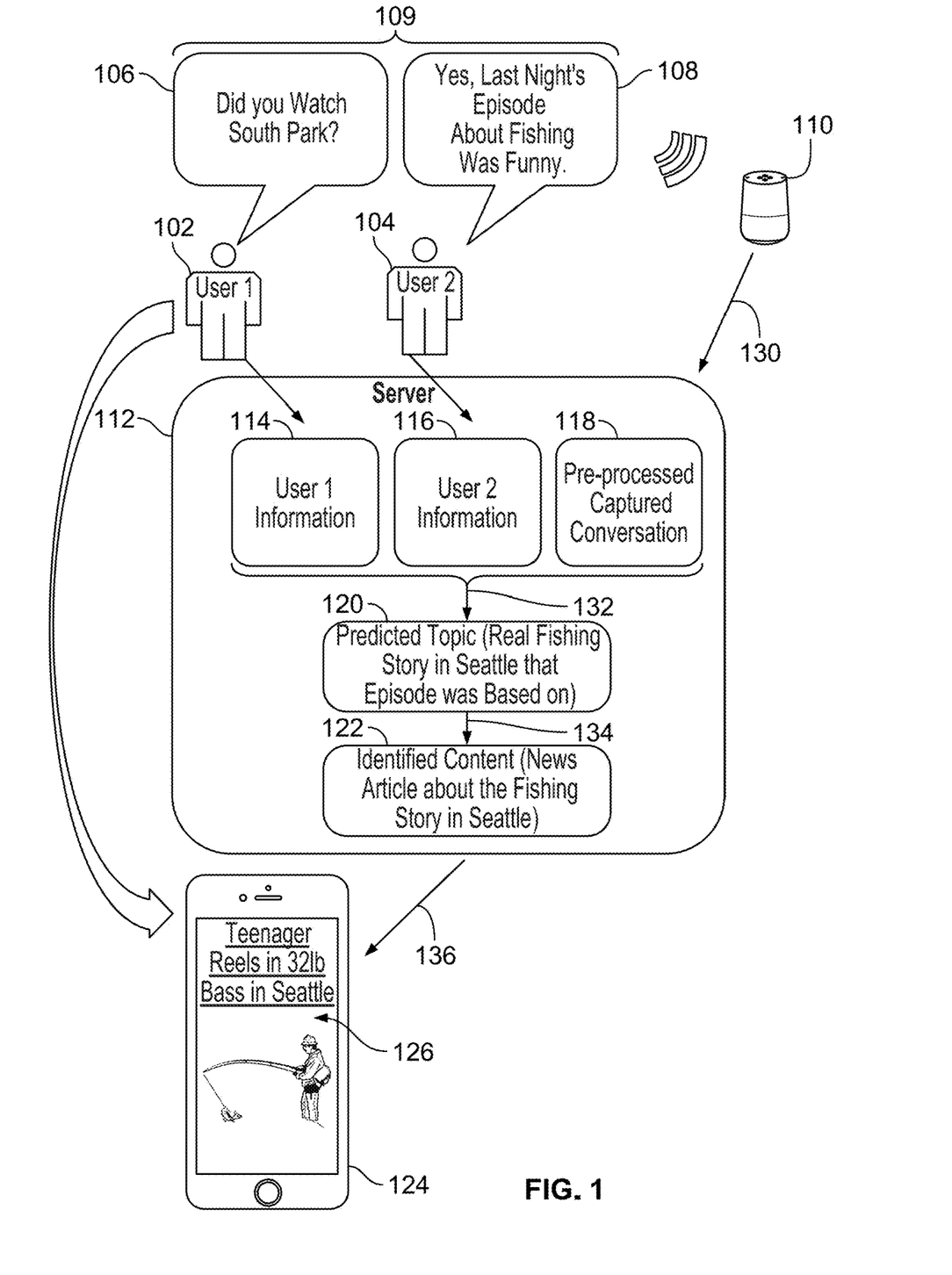
FIG. 1 shows an illustrative embodiment of predicting a future topic of a current conversation captured by a digital speech assistant and providing information about identified content associated with the predicted topic, in accordance with some embodiments of the present disclosure.

FIG. 1 shows an illustrative embodiment of predicting a future topic of a current conversation captured by a digital speech assistant and providing information about identified content associated with the predicted topic, in accordance with some embodiments of the present disclosure. As shown, a first user 102 and a second user 104 engage in a conversation 109 about the TV show "South Park." For example, the first user 102 may begin the conversation 109 by asking "Did you watch South Park?" 106. The second user 104 may respond with "Yes, last night's episode about fishing was funny" 108. Audio of this first part of the conversation 109 may be captured by a digital speech assistant 110 in the vicinity of the first user 102 and the second user 104 and uploaded in real-time to a server 112 (Step 130). In some embodiments, the digital speech assistant 110 may capture the conversation 109 during "always-on" listening. In some embodiments, one of the first user 102 and the second user 104 may initiate listening by the digital speech assistant 110.

Although the first part of the conversation 109 is described as being a voice conversation between the first user and the second user, in other embodiments, the first part of the conversation 109 may be a text conversation between the first user and the second user over a text messaging platform or any other platform (e.g., social media, videoconference, personal or vehicle navigation, or any other suitable platform or application that provides an opportunity for a user to engage in a conversation with other users or with an electronic participant).

In some embodiments, the server 112 may perform pre-processing on the received audio of the first part of the conversation 109 to generate pre-processed captured conversation 118. For example, the server 112 may convert the received audio to text and use natural language processing to identify a sequence of keywords or topics in the first part of the conversation 109. The server 112 may convert the identified sequence of keywords or topics into a form suitable for further processing, as described in greater detail below. The server 112 may also perform voice recognition on the received audio to identify the first user 102 and the second user 104. If the identity of one of the first user 102 and the second user 104 cannot be determined by voice recognition, the server may determine the identity of one of the first user 102 and the second user 104 from the conversation 109 itself (e.g., "Hey Dad"). However, this is only an example, and the digital speech assistant 110 may also process the audio of the first part of the conversation 109, identify the first user 102 and the second user 104, and provide this information to the server 112 (e.g., instead of the captured audio).

The server 112 may retrieve information about the first user 102 and the second user 104. For example, the server 112 may retrieve user information 114 of the first user 102 and user information 116 of the second user 104. In some embodiments, the user information 114 and the user information 116 are stored user profiles. The devices and systems described herein may allow a user to provide profile information. Alternatively, the information may be automatically compiled by e.g., analyzing conversations of a user. The server 112 may also retrieve information from, e.g., websites on the Internet that a user accesses, such as a social network of the user, from a handheld device of the user, etc. Alternatively, if information about a user is not available, user information may be gleaned from the first part of the conversation 109. For example, the server 112 may analyze the uploaded audio to determine if a user is a woman, a man, a child, an elderly person, etc.

The server 112 may predict a topic (predicted topic 120) of a second part of the conversation 109 between the first user 102 and the second user 104 (Step 132). To do this, the server 112 may access a database of classified information about a large number of prior conversations between users and information about those users. Using this database of classified information, the user information 114 and the user information 116, and the pre-processed captured conversation 118, the server 112 may predict the topic 120 of the second part of the conversation 109. For example, as explained in further detail below, the server 112 may identify similar prior conversations between users who are similar to the first user 102 and the second user 104. As shown, the server 112 may predict that a "real fishing story in Seattle that [last night's] episode [of South Park] was based on" will be a topic of a second part of the conversation 109.

The server 112 may perform a search and identify content (identified content 122) that is associated with the predicted topic 120 (Step 134). For example, the server 112 may identify a news article about the real fishing story in Seattle ("Teenager Reels In 32 lb Bass In Seattle") as the identified content 122. The way in which the server 112 may identify content is explained in greater detail below.

The server 112 may provide information about the identified content 122. For example, the server 112 may transmit information about the identified content 122 to a phone 124 belonging to the first user 102 (Step 136). However, this is only an example, and the server 112 may provide the information about the identified content 122 to any device associated with either of the first user 102 or the second user 104, or to a device associated with a user other than the first user 102 or the second user 104. The information may be, e.g., the news article, a URL of the news article, an image of the news article, the text of the news article, or any other information about the identified content 122. As shown, the phone 124 may display the received information about the identified content 122 on a screen 126.

Figure 2:
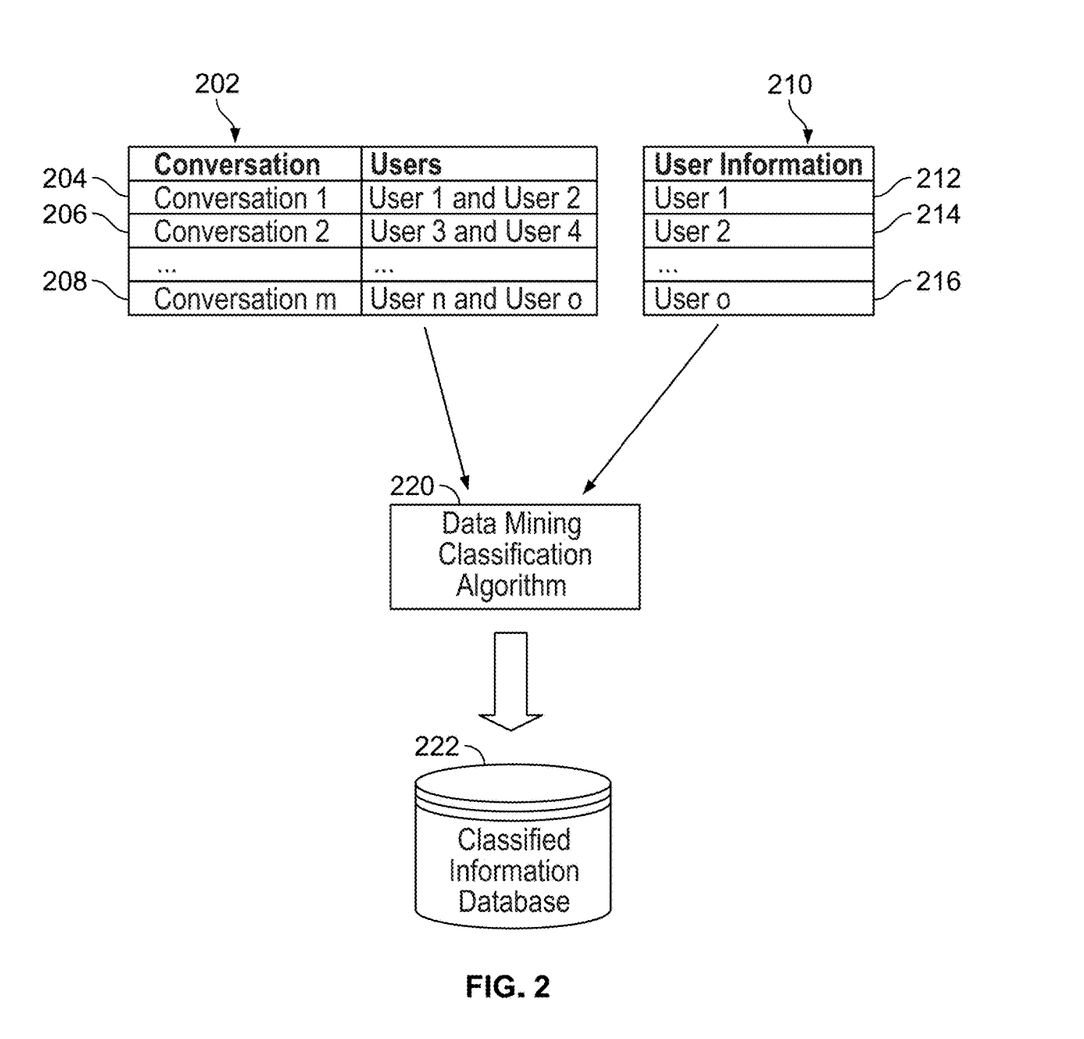
FIG. 2 shows an illustrative embodiment of classifying information in a classified information database, in accordance with some embodiments of the present disclosure.

FIG. 2 shows an illustrative embodiment of classifying information in a classified information database 222, in accordance with some embodiments of the present disclosure. As shown, a plurality of prior conversations 202 is stored in a database. The plurality of prior conversations 202 may include a first prior conversation 204 between user 1 and user 2, a second prior conversation 206 between user 3 and user 4 . . . and an $m^{th}$ prior conversation 208 between user n and user o. It may be advantageous to include a large number of conversations in the plurality of prior conversations 202, in order to improve the prediction of future topics in a current conversation. The plurality of prior conversations 202 may be, e.g., collected by a plurality of different digital speech assistants and stored in the cloud. The database may also include user information 210 associated with the users in the plurality of prior conversation 202. For example, the user information 210 may include user information 212 for user 1, user information 214 for user 2, and user information 216 for an o$^{th}$ user.

The plurality of prior conversations 202 and the user information 210 may be classified by data mining classification algorithm 220. The data mining classification algorithm 220 may be any appropriate data mining classification algorithm (e.g., Naïve Bayes, Stochastic Gradient Descent, K-Nearest Neighbors, Decision Tree, Random Forest, Neural Networks, Support Vector Machine, etc.) to classify the data into classes. Using a data mining classification algorithm to classify data is known to those of ordinary skill in the art and it is not discussed in detail here. After the data is classified, it may be stored in the classified information database 222. Periodically, when additional conversations and user information are received, the classified information database 222 may be updated by classifying the additional conversations and user information.

Figure 3:
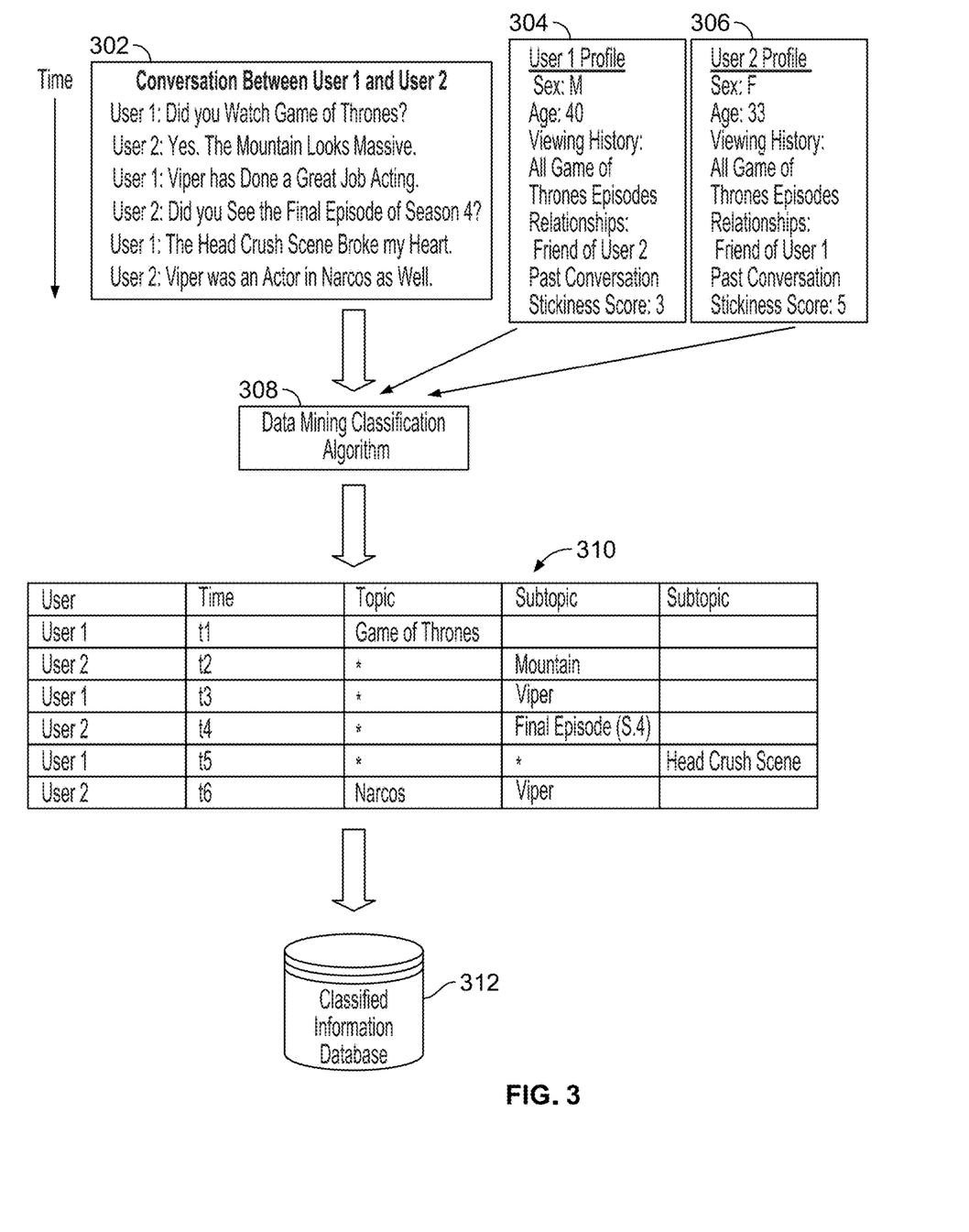
FIG. 3 shows an illustrative embodiment of how a specific prior conversation may be classified, among the plurality of prior conversations discussed in the classification example shown in FIG. 2, in accordance with some embodiments of the present disclosure.

FIG. 3 shows an illustrative embodiment of how a specific prior conversation may be classified, among the plurality of prior conversations 202 discussed in the classification example shown in FIG. 2, in accordance with some embodiments of the present disclosure. As shown, the prior conversation 302 may include a prior conversation between user 1 and user 2. User 1 may begin the conversation 302 by asking "Did you watch Game of Thrones?" User 2 may respond with "Yes. The Mountain looks Massive." User 1 may then say "Viper has done a great job acting." User 2 may then ask "Did you see the final episode of Season 4?" User 1 may respond with "The Head Crush Scene broke my heart." User 2 may then say "Viper was an actor in Narcos as well."

As shown, the conversation 302, along with user information (e.g., user 1 profile 304 and user 2 profile 306), may be classified by data mining classification algorithm 308. Although only the conversation 302, user 1 profile 304, and the user 2 profile 306 are shown, it should be understood that a large set of conversations and user information can be classified by the data mining classification algorithm 308. Before being processed by the data mining classification algorithm 308, the conversation 302, the user 1 profile 304, and the user 2 profile 306 may be pre-proceed into a form that is able to be classified by the data mining classification algorithm 308.

Different data classes (e.g., including classes and subclasses which respectively correspond to topics and subtopics) may be determined after classifying a large set of conversations and user profiles. For example, as shown, the conversation 302 may be classified in a sequence of classes/subclasses in classification table 310: "Game of Thrones" at time t1 (first class), "Mountain" (sub-class of "Game of Thrones" class) at time t2, "Viper" at time t3 (sub-class of "Game of Thrones" class), "Final Episode (Season 4)" at time t4 (sub-class of "Game of Thrones" class), "Head Crush Scene" at time t5 (sub-class of "Final Episode (Season 4)" sub-class), and "Narcos" at time t6 (second class).

The classification table 310 may also include classes for the user 1 profile 304 and the user 2 profile 306. As shown, the user 1 profile 304 may include: "Sex: M," Age: 40," "Viewing History: All Game of Thrones Episodes," "Relationships: Friends of User 2," and "Past Conversation Stickiness Score: 3." User 2 profile 306 may include: "Sex: F," Age: 30," "Viewing History: All Game of Thrones Episodes," "Relationships: Friends of User 1," and "Past Conversation Stickiness Score: 5." However, this information is only an example, and user profiles may include more or less information about the user. In the exemplary user profiles above (the user 1 profile 304 and the user 2 profile 306), "Relationships" may include the different types of relationships a user has with other users (e.g., friend, parent, child, co-worker, etc.). "Viewing History" may include different types of content (e.g., media content) that a user has viewed or listened to (e.g., movies, tv shows, podcasts, news articles, etc.). "Past Conversation Stickiness Score" may include a length of a time period before a prior conversation (of the user) associated with a first topic becomes associated with a second topic. For example, as shown in the classification table 310, the time between the first topic (class) "Game of Thrones" at time t1 and the second topic (class) "Narcos" at time t6 is the time between time t1 and time t6. A user's "Past Conversation Stickiness Score" may be averaged across all prior conversations of the user, or only certain ones of the prior conversations of the user (e.g., only conversations between the user and another specific user). In some embodiments, different users of the same conversation may receive the same identified content based on the predicted content. In other embodiments, different users of the same conversation may receive different identified content based on the predicted content (e.g., based on the user profiles of the users).

The classification table 310 may be stored with other classification tables in a classified information database 312. In this way, as described in further detail below, the classified information database 312 may be accessed to extract predicted content based on known information about a current conversation. For example, a server, using a data mining classification algorithm, may identify similar conversations (a similar sequence of classes and subclasses) between users having similar information to users in the current conversations.

Figure 4:
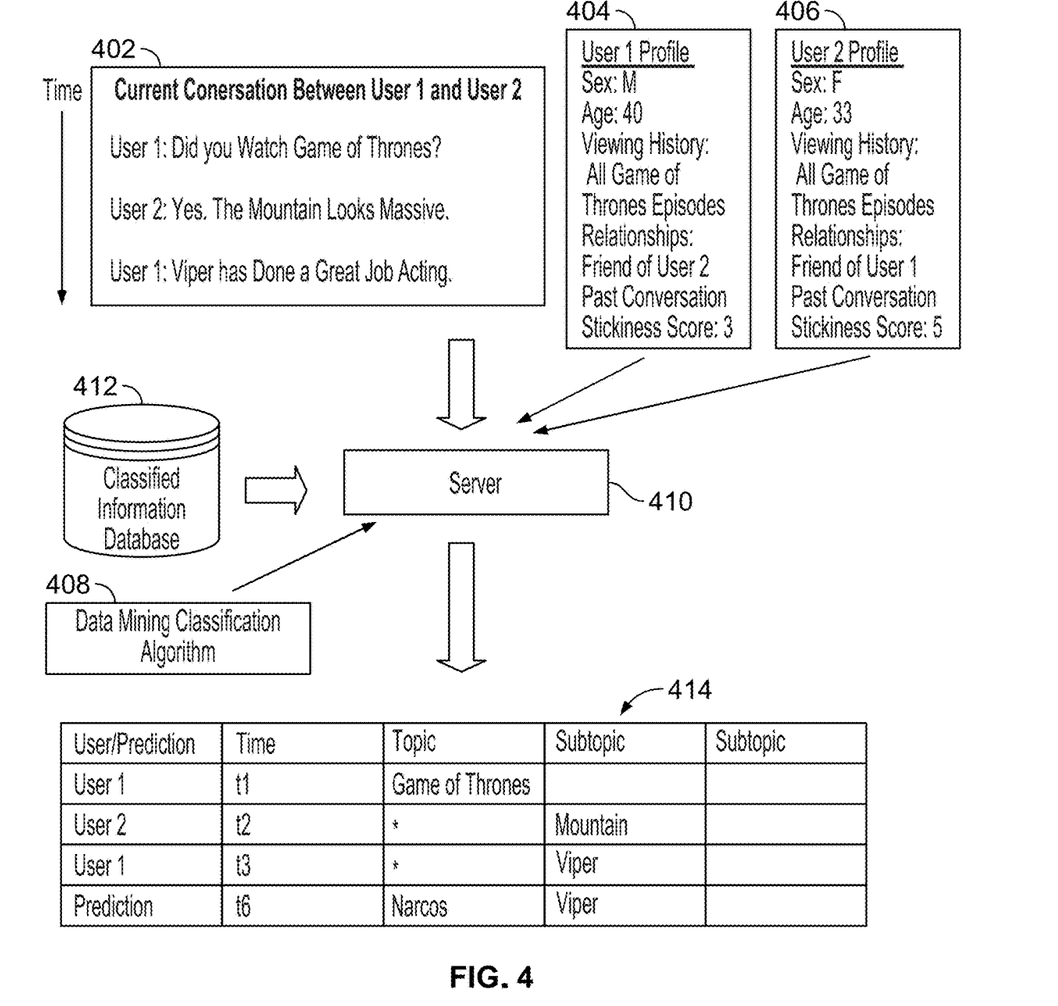
FIG. 4 shows an illustrative embodiment of predicting a future topic of a current conversation between two users, according to some embodiments of the present disclosure.

FIG. 4 shows an illustrative embodiment of predicting a future topic of a current conversation between two users, according to some embodiments of the present disclosure. As shown, the first part of a current conversation 402 between user 1 and user 2, is captured by a digital speech assistant and received by a server 410 in real-time. As shown, the conversation 402 may include a conversation between user 1 and user 2. For purposes of understanding, the first part of the current conversation 402 is the same as the first part of the prior conversation 302 discussed in the specific classification example of FIG. 3. For example, user 1 may begin the conversation by asking "Did you watch Game of Thrones?" User 2 may respond with "Yes. The Mountain looks Massive." User 1 may then say "Viper has done a great job acting." The server 410 may retrieve information about user 1 and user 2. For example, the server 410 may retrieve user 1 profile 404 and user 2 profile 406. The server 410 may also retrieve classified conversations and user information from classified information database 412.

As shown, the server 410 may use data mining classification algorithm 408 to predict a future topic. For example, the server 410 may predict that "Narcos" (class) 414 will be discussed in the future. The server 410 may make this prediction by classifying the first part of the current conversation 402, along with user 1 profile 404 and user 2 profile 406 to identify similar conversations previously conducted between users having similar profiles to the users of the current conversation. For example, the server 410 may identify the prior conversation 302 in the specific classification example of FIG. 3 (which is stored in the classified information database 412). The data mining classification algorithm 408 may be the same data mining classification algorithm used to classify the information in the classified information database.

Although the server 410 may predict that "Narcos" 414 will be discussed in the future, the server 410 may also predict a topic that may be discussed in the more near future (e.g., "Season 4 of Game of Thrones"—a sub-class of the current class ("Game of Thrones") or "Head Crush Scene"—a sub-sub-class of the current class ("Game of Thrones")). In some embodiments, the server 410 may predict different topics for different users of the same conversation (e.g., based on the respective user information). In some embodiments, the server 410 may also predict when the predicted topics will be discussed and use this predicted time to adjust the timing of when information associated with the predicted topics is provided to users. In some embodiments, this predicted time is predicted based on the respective user information of the users in the conversation.

Figure 5:
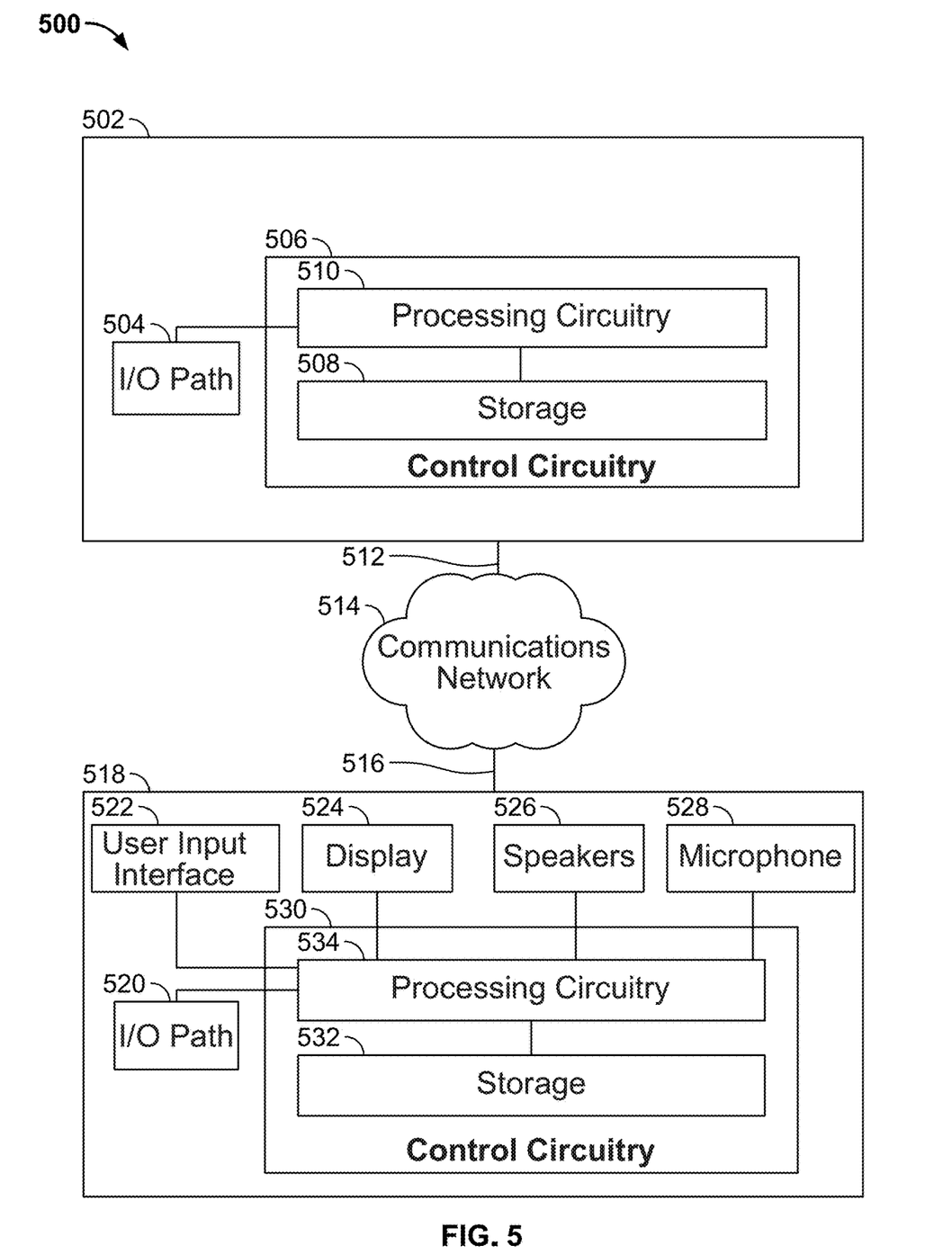
FIGS. 5-6 describe exemplary devices, systems, servers, and related hardware for analyzing current conversations to predict a future topic, identify content related to the predicted topic, and provide the information about the identified content, in accordance with some embodiments of the present disclosure.
Figure 6:
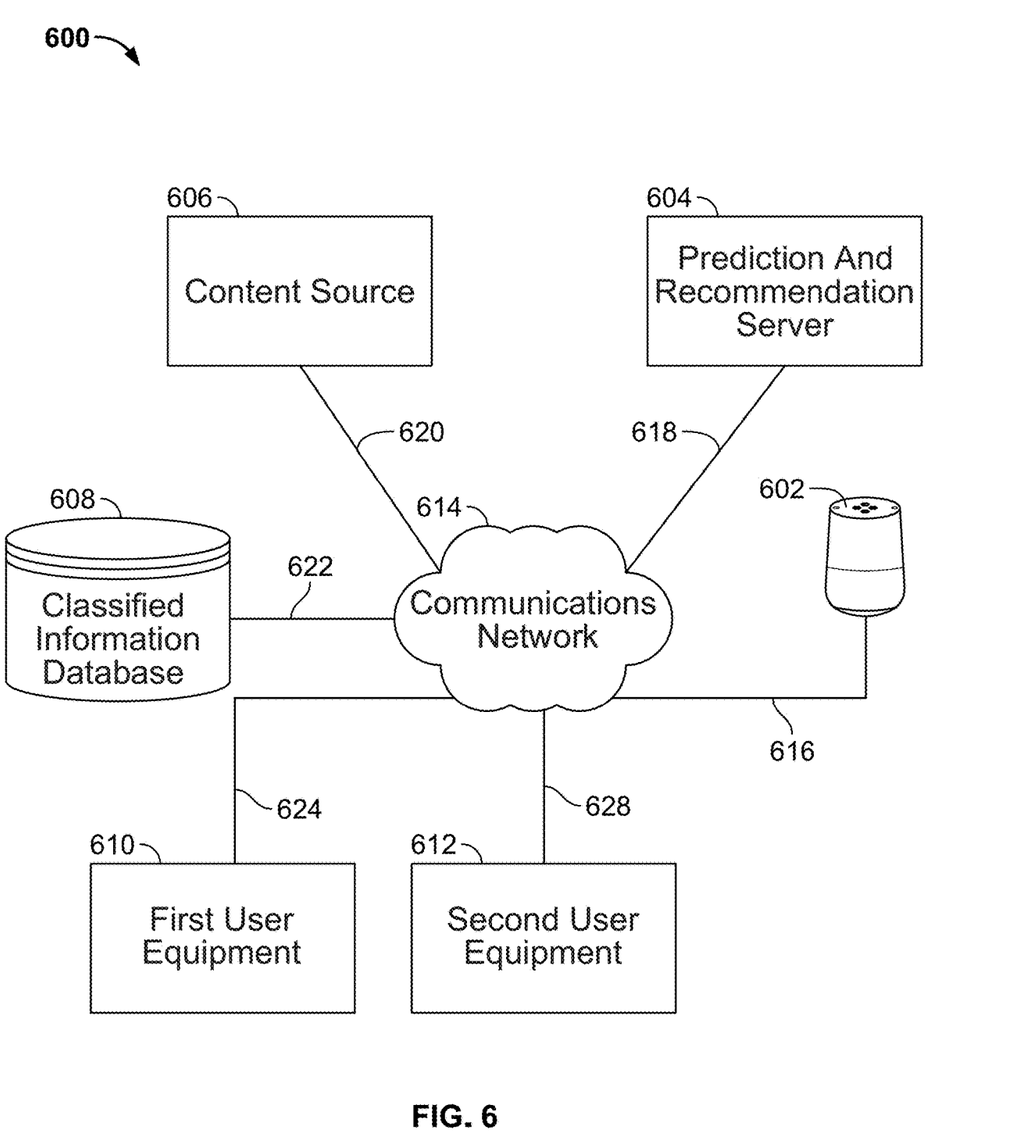

FIGS. 5-6 describe exemplary devices, systems, servers, and related hardware for analyzing current conversations to predict a future topic, identify content related to the predicted topic, and provide the information about the identified content, in accordance with some embodiments of the present disclosure. FIG. 5 shows a generalized embodiment of a server (e.g., illustrative servers 112 and 410) connected with a remote user equipment device (e.g., illustrative remote user equipment devices 110 and 124). More specific implementations of the devices are discussed below in connection with FIG. 6.

System 500 is depicted having server 502 connected with remote user equipment 518 (e.g., a user's digital speech assistant or a user's smartphone) via communications network 514. For convenience, because the system 500 is described from the perspective of the server 502, the remote user equipment 518 is described as being remote (i.e., with respect to the server 502). The remote user equipment 518 may be connected to the communications network 514 via a wired or wireless connection and may receive content and data via input/output (hereinafter "I/O") path 520. The server 502 may be connected to the communications network 514 via a wired or wireless connection and may receive content and data via I/O path 504. The I/O path 504 and/or the I/O path 520 may provide content (e.g., broadcast programming, on-demand programming, Internet content, and other video, audio, or information) and data to remote control circuitry 530 and/or control circuitry 506, which includes remote processing circuitry 534 and storage 532, and/or processing circuitry 510 and storage 508. The remote control circuitry 530 may be used to send and receive commands, requests, and other suitable data using the I/O path 520. The I/O path 520 may connect the remote control circuitry 530 (and specifically, the remote processing circuitry 534) to one or more communications paths (described below). Likewise, the control circuitry 506 may be used to send and receive commands, requests, and other suitable data using the I/O path 504. I/O functions may be provided by one or more of these communications paths, but are shown as a single path in FIG. 5 to avoid overcomplicating the drawing.

The remote control circuitry 530 and the control circuitry 506 may be based on any suitable remote processing circuitry such as processing circuitry based on one or more microprocessors, microcontrollers, digital signal processors, programmable logic devices, etc. In some embodiments, the control circuitry 506 executes instructions for a voice processing application, a classification and prediction application, a content identification application, and a pre-processing application stored in memory (i.e., the storage 508). In client-server based embodiments, the control circuitry 506 may include communications circuitry suitable for communicating with remote user equipment (e.g., the remote user equipment 518) or other networks or servers. For example, the voice processing application may include a first application on the server 502 and may communicate via the I/O path 504 over the communications network 514 to the remote user equipment 518 associated with a second application of the voice control application. Additionally, the other ones of the classification and prediction application, the content identification application, and the pre-processing application may be stored in the remote storage 532. In other embodiments, the remote control circuitry 530 may execute the voice processing application to process conversations of the users and send the processed conversations to the server 502 as text. The voice control application (or any of the other applications) may coordinate communication over communications circuitry between the first application on the server and the second application on the remote user equipment. Communications circuitry may include a modem or other circuitry for connecting to a wired or wireless local or remote communications network. Such communications may involve the Internet or any other suitable communications networks or paths (which is described in more detail in connection with FIG. 6). In addition, communications circuitry may include circuitry that enables peer-to-peer communication of user equipment devices (e.g., WiFi-direct, Bluetooth, etc.), or communication of user equipment devices in locations remote from each other.

Memory (e.g., random-access memory, read-only memory, or any other suitable memory), hard drives, optical drives, or any other suitable fixed or removable storage devices may be provided as the remote storage 532 and/or the storage 508. The remote storage 532 and/or the storage 508 may include one or more of the above types of storage devices. The remote storage 532 and/or storage 508 may be used to store various types of content described herein and voice processing application data, classification and prediction application data, content identification application data, pre-processing application data, user profiles, or other data used in operating the voice processing application, the classification and prediction application, the content identification application, and the pre-processing application. Nonvolatile memory may also be used (e.g., to launch a boot-up routine and other instructions). Although the applications are described as being stored in the storage 506 and/or the remote storage 532, the applications may include additional hardware or software that may not be included in the storage 508 and the remote storage 532.

A user may control the remote control circuitry 530 using user input interface 522. The user input interface 522 may be any suitable user interface, such as a remote control, mouse, trackball, keypad, keyboard, touch screen, touchpad, stylus input, joystick, microphone, voice recognition interface, or other user input interfaces. Display 524 may be provided as a stand-alone device or integrated with other elements of the remote user equipment 518. The display 512 may be one or more of a monitor, a television, a liquid crystal display (LCD) for a mobile device, or any other suitable equipment for displaying visual images. Speakers 514 may be provided as integrated with other elements of the remote user equipment 518 or may be stand-alone units. Microphone 528 may be provided as a stand-alone device or integrated with other elements of the remote user equipment 518.

The voice processing application, the classification and prediction application, the content identification application, and the pre-processing application may be implemented using any suitable architecture. For example, they may be stand-alone applications wholly implemented on the server 502. In another embodiment, some of the applications may be client-server based applications. For example, the voice processing application may be a client-server based application. Data for use by a thick or thin client implemented on remote user equipment 518 may be retrieved on-demand by issuing requests to a server (e.g., the server 502) remote to the user equipment. In another embodiment, the server may be omitted and the application may be implemented on the remote user equipment.

In some embodiments, as described above, the voice processing application, the classification and prediction application, the content identification application, and the pre-processing application may be implemented on the server 502. In this example, the remote user equipment 518 simply provides captured audio of a conversation to the server 502. However, this is only an example, and in other embodiments, the applications may be implemented on a plurality of devices (e.g., the remote user equipment 518 and the server 502) to execute the features and functionalities of the applications. The applications may be configured such that features that require processing capabilities beyond the remote user equipment 518 are performed on the server 502 while other capabilities of the applications are performed on remote user equipment 532.

Though exemplary system 500 is depicted having two devices implementing the voice processing application, the classification and prediction application, the content identification application, and the pre-processing application, any number of devices may be used.

The system 500 of FIG. 5 can be implemented in system 600 of FIG. 6 as digital speech assistant 602, prediction and recommendation server 604, first user equipment 610, second user equipment 612, or any other type of user equipment suitable for interfacing with the voice processing application, the classification and prediction application, the content identification application, and the pre-processing application. Various network configurations of devices may be implemented and are discussed in more detail below.

The first user equipment 610 may include a PC, a laptop, a tablet, a personal computer television (PC/TV), a PC media server, a PC media center, a smartphone, a mobile telephone, a portable video player, a portable music player, a portable gaming machine, a wireless remote control, or other suitable electronic user device. The first user equipment 610 may belong to a first user. The second user equipment 612 may include any of the devices discussed above with respect to the first user equipment 612, but may belong to a second user. The digital speech assistant 602 may include a smart speaker, a standalone voice assistant, smart home hub, etc.

It should be noted that the lines have become blurred when trying to classify a device as one of the above devices. In fact, each of the digital speech assistant 602, the prediction and recommendation server 604, the first user equipment 610, and the second user equipment 612 may utilize at least some of the system features described above in connection with FIG. 5.

The digital speech assistant 602, the first user equipment 610, and the second user equipment 612 may be coupled to communications network 614. Namely, digital speech assistant 602, the first user equipment 610, and the second user equipment 612 are coupled to communications network 614 via communications paths 616, 624, and 628, respectively. The communications network 614 may be one or more networks including the Internet, a mobile phone network, mobile device (e.g., iPhone) network, cable network, public switched telephone network, or other types of communications network or combinations of communications networks. The paths 616, 624, and 628 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths.

Although communications paths are not drawn between the digital speech assistant 602, the first user equipment 610, and the second user equipment 612, these devices may communicate directly with each other via communication paths, such as those described above in connection with 616, 624, and 628, as well other short-range point-to-point communication paths, wireless paths (e.g., Bluetooth, infrared, IEEE 902-11x, etc.), other short-range communication via wired or wireless paths, or directly through an indirect path via communications network 614. BLUETOOTH is a certification mark owned by Bluetooth SIG, INC.

The system 600 also includes the prediction and recommendation server 604, content source 606, and classified information database 608 coupled to communications network 614 via communication paths 618, 620, and 622, respectively. The paths 618, 620, and 622 may include any of the communication paths described above in connection with paths with 616, 624, and 628.

The content source 606 may store or index a plurality of data used for identifying content associated with a predicted topic of a current conversation. In some embodiments, the content source 606 may index the location of content located on servers located remotely or local to the content source 606. In response to receiving a predicted topic, the content identification application may access the index stored on the content source 606 and may identify a server (e.g., a database stored on a server) comprising the content associated with the predicted topic. For example, the content identification application may receive a predicted topic about "a real fishing story in Seattle that an episode of South Park was based on." In response to receiving this predicted topic, the content identification application may search the content source 606 for a website that contains information about the real fishing story in Seattle (e.g., "Teenager Reels in 32 Lb Bass In Seattle"), may access the website for the information, and may provide this information (e.g., a URL) to the first user equipment 610 or the second user equipment 612.

The system 600 is intended to illustrate a number of approaches, or configurations, by which user equipment, databases, sources, and servers, may communicate with each other. The present disclosure may be applied in any one or a subset of these approaches, or in a system employing other approaches for delivering and providing a voice processing application, a classification and prediction application, a content identification application, and a pre-processing application.

Figure 7:
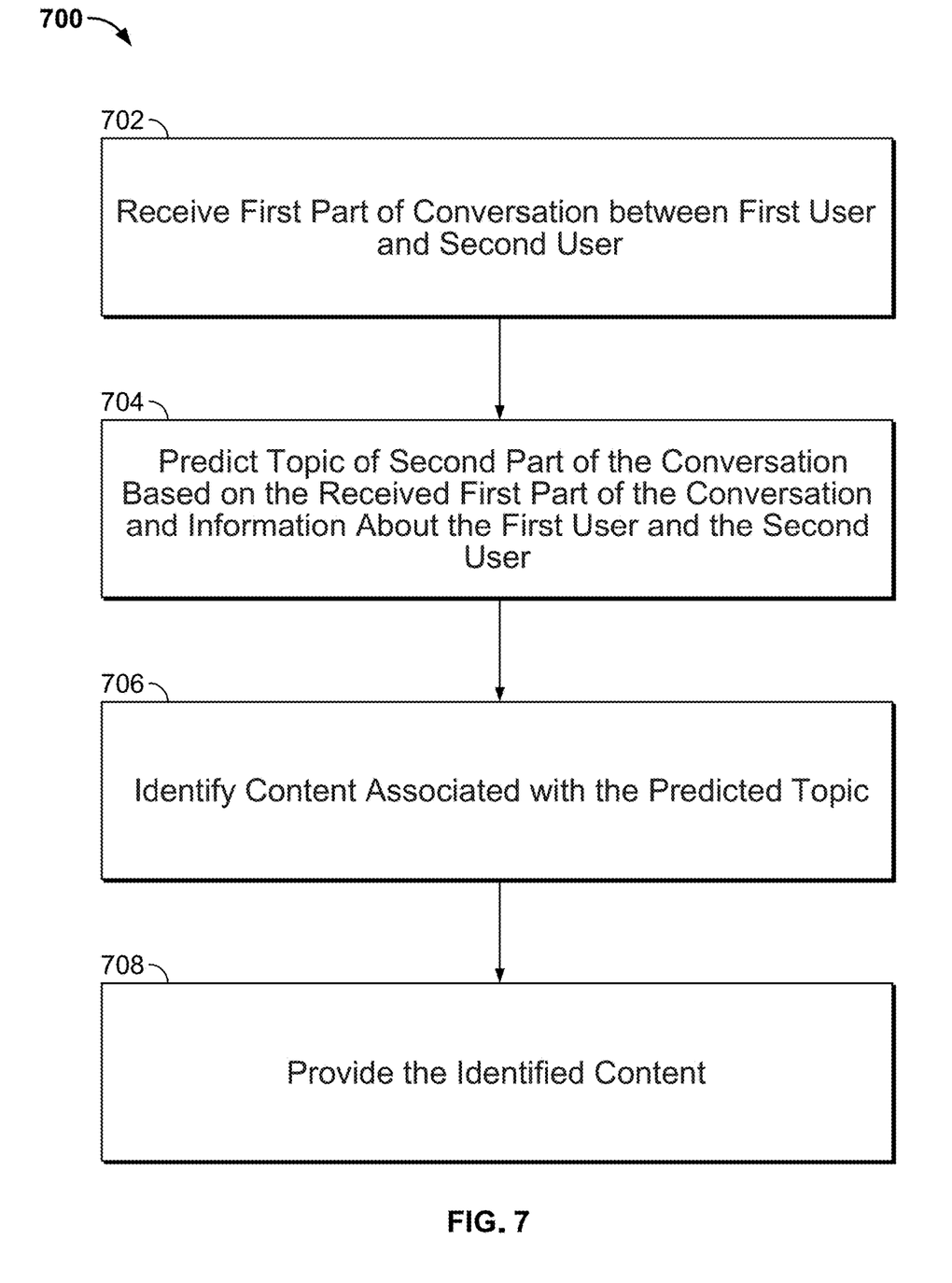
FIG. 7 is a flowchart of illustrative steps for predicting a topic of a current conversation and providing content identified as being associated with the predicted topic, in accordance with some embodiments of the present disclosure.

FIG. 7 is a flowchart of illustrative steps for predicting a topic of a current conversation and providing content identified as being associated with the predicted topic, in accordance with some embodiments of the present disclosure. For example, a voice processing application, a pre-processing application, a classification and prediction application, and a content identification application implementing process 700 may be executed by the control circuitry 506 of the server 502. In some embodiments, instructions for executing process 700 may be encoded onto a non-transitory storage medium (e.g., the storage 508) as a set of instructions to be decoded and executed by processing circuitry (e.g., the processing circuitry 510). Processing circuitry may, in turn, provide instructions to other sub-circuits contained within control circuitry 506, such as the encoding, decoding, encrypting, decrypting, scaling, analog/digital conversion circuitry, and the like. It should be noted that process 700, or any step thereof, could be performed on, or provided by, any of the devices shown in FIGS. 1 and 5-6.

Process 700 begins at 702, when the server 502 receives a first part of a conversation between a first user and a second user. Audio of the first part of the conversation may be, e.g., detected by the microphone 528 of the remote user equipment 518 (e.g., the digital speech assistant 616), and transmitted in real-time to the server 502. The voice processing application and the pre-processing application (e.g., via the control circuitry 506) may convert the received audio of the first part of the conversation to text and use natural language processing to identify a sequence of keywords or topics, and convert the identified sequence of keywords or topics into a form suitable for further processing by the classification and prediction application. In another embodiment, the voice processing application and the pre-processing application may process the captured audio of the first part of the conversation via the remote control circuitry 530 and transmit the processed audio to the server 502.

At step 704, the classification and prediction application (e.g., via the control circuitry 506) may predict a topic of a second part of the conversation between the first user and the second user. For example, as explained in greater detail in FIG. 8, the control circuitry 506 may predict the topic based on the converted sequence of keywords or topics and information about the first user and the second user.

At step 706, the content identification application (e.g., via the control circuitry 506) may identify content associated with the predicted topic. For example, the control circuitry 506 may transmit a search inquiry to a server or database (e.g., the content source 606 via the communications network 614 or the storage 508) and may, in response to transmitting the inquiry, receive a response including content matching the inquiry (i.e., content associated with the predicted topic).

At step 708, the control circuitry 506 may transmit information about the identified content to user equipment (e.g., the first user equipment 610 and/or the second user equipment 612 via the communication network 614). The information about the identified content may be e.g., the identified content itself, a URL of the identified content, an image of the identified content, any other information about the identified content, etc. In some embodiments, as discussed above, the timing of when the information about the identified content is transmitted to the user equipment may be based on information about the users. For example, a user's stickiness score may be used to determine the timing of when the information about the identified content is transmitted to user equipment associated with that user (e.g., the first user equipment 610). For example, if the control circuitry 506 determines that a user is not likely to discuss a predicted topic for a few minutes (e.g., the user has a high "stickiness score"), the control circuitry 506 may delay transmitting the information about the identified content to the user equipment associated with that user (e.g., the first user equipment 610). Alternatively, if the control circuitry 506 determines that a user is likely to discuss a predicted topic soon (e.g., the user has a low "stickiness score"), the control circuitry 506 may immediately send the information about the identified content to the user equipment associated with that user (e.g., the second user equipment 612). When the information about the identified content is received by the user equipment (e.g., the first user equipment 610 and/or the second user equipment 612), the user equipment may notify that user that the information about the identified content has been received (e.g., with a vibration, prompt, or sound). In some embodiments, a digital speech assistant (e.g., the digital speech assistant 602) may notify the user that the information about the identified content is available and audibly prompt the user whether or not they are interested in accessing the related content. The prompt may also include instructions on how to access the information about the identified content. In some embodiments, the user equipment device may automatically display the identified content, the URL of the identified content, an image of the identified content, any other information about the identified content, etc. In some embodiments, the user equipment device may display the identified content, the URL of the identified content, an image of the identified content, any other information about the identified content, etc., after a user has responded to a prompt and indicating that they wish to access the respective content.

Figure 8:
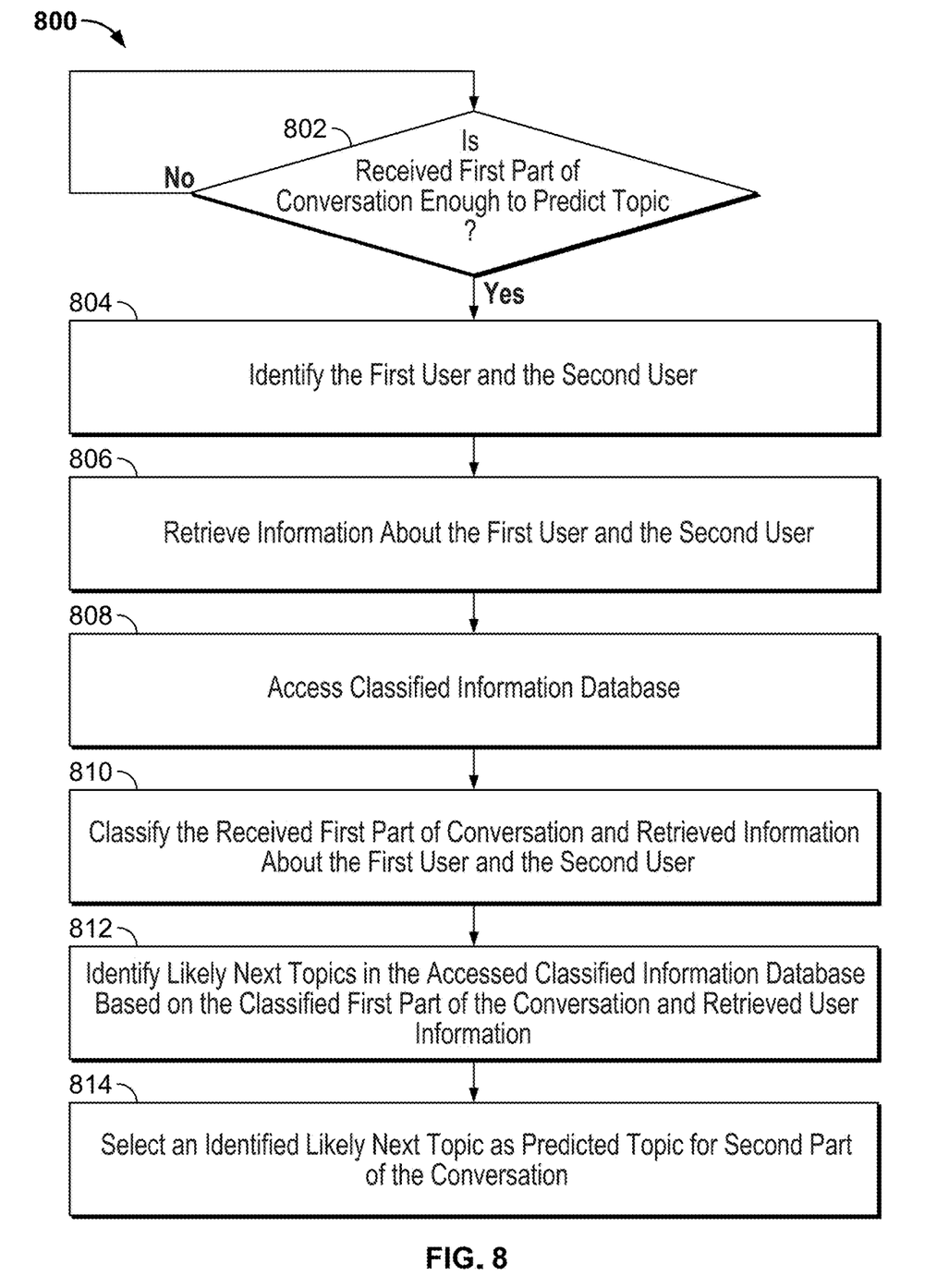
FIG. 8 is a flowchart of illustrative steps in step 704 of FIG. 7, in accordance with some embodiments of the present disclosure.

FIG. 8 is a flowchart of illustrative steps in step 704 of FIG. 7, in accordance with some embodiments of the present disclosure.

At step 802, the control circuitry 506 may determine if the received first part of the conversation is enough to predict a topic of a second part of the conversation. For example, in one embodiment, in order to improve the accuracy of the predicted topic, the control circuitry 506 may determine if at least a certain number of topics or sub-topics have been discussed (in the received first part of the conversation). The certain number of topics may be predetermined (e.g., two), or may be determined based on the topics or sub-topics that have been discussed. If not ("N" at 802), the control circuitry 506 may return to step 802 and wait for additional conversation to be received. If yes, ("Y" at 802), the control circuitry 506 may proceed to step 804.

At step 804, the control circuitry 506 may identify the first user and the second user. In one embodiment, the control circuitry 506 may perform voice recognition on the received first part of the conversation to identify the first user and the second user. In another embodiment, the control circuitry 506 may receive the identity of the first and the second user from user equipment (e.g., the first user equipment 610, the second user equipment 612, or the digital speech assistant 602, via the communications network 614). In yet another embodiment, the control circuitry 506 may determine the identity of the first user and the second user by analyzing the received first part of the conversation itself (e.g., "Hey Dad").

At step 806, the control circuitry 506 may retrieve information about the first user and the second user, based on the determined identity of the first user and the second user. In one embodiment, the control circuitry 506 may retrieve user profiles of the first user and the second user that are stored in a memory (e.g., the storage 508). In another embodiment the control circuitry may retrieve user profiles of the first user and the second user from user equipment (e.g., the first user equipment 610, the second user equipment 612, or the digital speech assistant 602, via the communications network 614).

At step 808, the control circuitry 506 may access the classified information database 608 via the communications network 614. In another embodiment, the classified information database may be stored locally in the storage 508.

At step 810, the control circuitry 506 may classify the received first part of the conversation and the retrieved information about the first user and the second user using, e.g., a data mining classification algorithm. The data mining classification algorithm may be the same type of data mining classification algorithm used to classify the information in the classified information database.

At step 812, the control circuitry 506 may identify likely next topics in the accessed classified information database based on the classified first part of the conversation and the retrieved user information. For example, the control circuitry 506 may identify similar prior conversations (i.e., to the received first part of the conversation) between users who are similar to the first and the second user, and extract next topics in the identified similar prior conversations as the identified likely next topics. In one embodiment, the control circuitry 506 may extract multiple next topics as the identified likely next topics.

At step 814, the control circuitry 506 may select one of the identified likely next topics as the predicted topic for the second part of the conversation. The control circuitry 506 may make this selection based in part on the retrieved information about the first and the second user. In one embodiment, the control circuitry 506 may select different ones of the identified likely next topics as the predicted topic for different ones of the first user and the second user.

It is contemplated that the steps or descriptions of FIG. 7 or 8 may be used with any other embodiment of this disclosure. In addition, the descriptions described in relation to the algorithms of FIG. 7 or 8 may be done in alternative orders or in parallel to further the purposes of this disclosure. For example, conditional statements and logical evaluations may be performed in any order or in parallel or simultaneously to reduce lag or increase the speed of the system or method. As a further example, in some embodiments, several instances of a variable may be evaluated in parallel, using multiple logical processor threads, or the algorithm may be enhanced by incorporating branch prediction. Furthermore, it should be noted that the processes of FIG. 7 or 8 may be implemented on a combination of appropriately configured software and hardware, and that any of the devices or equipment discussed in relation to FIGS. 1 and 5-6 could be used to implement one or more portions of the process.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method of recommending content, the method comprising:
    receiving a first part of a conversation between a first user and a second user;
    retrieving user profile information of the first user and user profile information of the second user, wherein:
        the user profile information of each of the first user and the second user comprises at least one of a content viewing history of the respective user, an age of the respective user, a gender of the respective user, or a relationship between the first user and the second user; and
        the user profile information of the first user comprises a stickiness score of the first user, wherein the stickiness score corresponds to a length of a time period before a first topic becomes associated with a second topic in a plurality of prior conversations of the first user with a plurality of other users; and
    predicting a topic of a second part of the conversation between the first user and the second user by identifying a prior communication, wherein:
        the prior communication is identified based on the received first part of the conversation, the user profile information of the first user, and the user profile information of the second user;
        the predicted topic is a future topic of conversation that is a different topic than the first topic and the second topic; and
        the second part of the conversation occurs at a future time;
    predicting when the first user will discuss the predicted topic based on the stickiness score of the first user that corresponds to the length of the time period before the first topic becomes associated with the second topic in the plurality of prior conversations of the first user with the plurality of other users;
    identifying content associated with the predicted topic; and
    providing information about the identified content, wherein the timing of when to provide the information is selected based on the predicting when the first user will discuss the predicted topic based on the stickiness score of the first user.

2. The method of claim 1, wherein the first part of the conversation corresponds to a conversation captured by a listening device.

3. The method of claim 1, wherein the first part of the conversation corresponds to a conversation on a text messaging platform.

4. The method of claim 1, the method further comprising:
    accessing a database of classified information about a plurality of prior conversations between users and information of the users, wherein the information is classified using a first data classification algorithm, and wherein the predicting the topic of the second part of the conversation comprises using a second data classification algorithm to predict the topic of the second part of the conversation based on the received first part of the conversation, the information about the first user and the second user, and the accessed database of classified information.

5. The method of claim 4, the method further comprising:
    updating the database of classified information with information about the conversation between the first user and the second user and the information about the first user and the second user, wherein the information about the conversation between the first user and the second user and the information about the first user and the second user is classified using the first data classification algorithm.

6. The method of claim 1, the method further comprising: determining the number of topics of the received first part of the conversation,
wherein if it is determined that there is one and only one topic of the received first part of the conversation, the predicting the topic of the second part of the conversation comprises predicting a sub-topic of the topic of the received first part of the conversation, and
wherein if it is determined that there is more than one topic of the received first part of the conversation, the predicting the topic of the second part of the conversation comprises predicting a new topic related to the more than one topic of the received first part of the conversation.

7. The method of claim 1,
wherein the identifying of the prior communication comprises identifying the prior communication of another user with user profile information similar to the user profile information of at least one of the first user and the second user.

8. The method of claim 1, wherein the providing the information about the identified content comprises providing the information about the identified content to a device associated with at least one of the first user and the second user.

9. The method of claim 1, wherein the providing the information about the identified content comprises providing the information about the identified content to a device associated with a user other than the first user or the second user.

10. The method of claim 1, wherein at least one individual prior conversation of the plurality of prior conversations is a prior conversation of at least one of the first user and the second user.

11. A system for recommending content, the system comprising control circuitry configured to:
receive a first part of a conversation between a first user and a second user;
retrieve user profile information of the first user and user profile information of the second user, wherein:
the user profile information of each of the first user and the second user comprises at least one of a content viewing history of the respective user, an age of the respective user, a gender of the respective user, or a relationship between the first user and the second user; and
the user profile information of the first user comprises a stickiness score of the first user, wherein the stickiness score corresponds to a length of a time period before a first topic becomes associated with a second topic in a plurality of prior conversations of the first user with a plurality of other users;
predict a topic of a second part of the conversation between the first user and the second user by identifying a prior communication, wherein:
the prior communication is identified based on the received first part of the conversation, the user profile information of the first user, and the user profile information of the second user;
the predicted topic is a future topic of conversation that is a different topic than the first topic and the second topic; and
the second part of the conversation occurs at a future time;
predict when the first user will discuss the predicted topic based on the stickiness score of the first user that corresponds to the length of the time period before the first topic becomes associated with the second topic in the plurality of prior conversations of the respective user with the plurality of other users;
identify content associated with the predicted topic; and
provide information about the identified content, wherein the timing of when to provide the information is determined using the stickiness score.

12. The system of claim 11, wherein the system further comprises: a listening device configured to capture the first part of the conversation.

13. The system of claim 11, wherein the system further comprises:
a user device having a text messaging platform, wherein the user device in configured to capture the first part of the conversation on the text messaging platform.

14. The system of claim 11, wherein the control circuitry is further configured to:
access a database of classified information about a plurality of prior conversations between users and information of the users, wherein the information is classified using a first data classification algorithm; and
use a second data classification algorithm to predict the topic of the second part of the conversation based on the received first part of the conversation, the information about the first user and the second user, and the accessed database of classified information.

15. The system of claim 14, wherein the control circuitry is further configured to:
update the database of classified information with information about the conversation between the first user and the second user and the information about the first user and the second user, wherein the information about the conversation between the first user and the second user and the information about the first user and the second user is classified using the first data classification algorithm.

16. The system of claim 11, wherein the control circuitry is further configured to:
determine the number of topics of the received first part of the conversation,
wherein if it is determined that there is one and only one topic of the received first part of the conversation, the control circuitry is further configured to predict a sub-topic of the topic of the received first part of the conversation as the predicted topic, and
wherein if it is determined that there is more than one topic of the received first part of the conversation, the control circuitry is further configured to predict a new topic related to the more than one topic of the received first part of the conversation as the predicted topic.

17. The system of claim 11, wherein the identifying of the prior communication comprises identifying the prior communication of another user with user profile information similar to the user profile information of at least one of the first user and the second user.

18. The system of claim 11, wherein the control circuitry is further configured to:

provide the information about the identified content to a device associated with at least one of the first user and the second user.

19. The system of claim 11, wherein the control circuitry is further configured to:
provide the information about the identified content to a device associated with a user other than the first user or the second user.

20. The system of claim 11, wherein at least one individual prior conversation of the plurality of prior conversations is a prior conversation of at least one of the first user and the second user.

\* \* \* \* \*